US012743982B2

(12) United States Patent
Wu et al.

(10) Patent No.: US 12,743,982 B2
(45) Date of Patent: Sep. 22, 2026

(54) DISPLAY DEVICE WITH FIRST AND SECOND GAMMA VOLTAGE RANGES CORRESPONDING TO FIRST AND SECOND AMBIENT LIGHT RANGES

(71) Applicant: InnoLux Corporation, Miao-Li County (TW)

(72) Inventors: Yung-Hsun Wu, Miao-Li County (TW); Chia-Hao Tsai, Miao-Li County (TW); Chih-Lung Lin, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 19/071,701

(22) Filed: Mar. 5, 2025

(65) Prior Publication Data

US 2025/0316202 A1 Oct. 9, 2025

Related U.S. Application Data

(60) Provisional application No. 63/573,480, filed on Apr. 3, 2024.

(30) Foreign Application Priority Data

Dec. 9, 2024 (CN) ......................... 202411793473.1

(51) Int. Cl.
*G09G 3/20* (2006.01)

(52) U.S. Cl.
CPC ... *G09G 3/2007* (2013.01); *G09G 2320/0626* (2013.01); *G09G 2320/0673* (2013.01); *G09G 2360/144* (2013.01)

(58) Field of Classification Search
CPC ......... G09G 3/2007; G09G 2320/0626; G09G 2320/0673; G09G 2360/144
USPC .......................................................... 345/207
See application file for complete search history.

(56) References Cited

U.S. PATENT DOCUMENTS 11,658,262 B1 5/2023 Cheng
2013/0169693 A1* 7/2013 Pyo ...................... G09G 3/3225 345/76
2015/0070406 A1 3/2015 Baek
2016/0358538 A1 12/2016 Schuch
2017/0133357 A1 5/2017 Kuo
2017/0345801 A1 11/2017 Lin
2018/0114775 A1* 4/2018 Ray ......................... H01L 25/50

(Continued)

*Primary Examiner* — Nathan P Brittingham
(74) *Attorney, Agent, or Firm* — Winston Hsu

(57) ABSTRACT

A display device including a plurality of light emitting units, an ambient light sensor, and a Gamma voltage controller including a plurality of Gamma voltage groups is provided. The Gamma voltage groups includes a first Gamma voltage group and a second Gamma voltage group provided to the light emitting units respectively in a first operating mode and a second operating mode. The first Gamma voltage group includes a first voltage and a second voltage respectively corresponding to a lowest gray level and a highest gray level in the first operating mode, and the second Gamma voltage group includes a third voltage and a fourth voltage respectively corresponding to a lowest gray level and a highest gray level in the second operating mode. An absolute value of a difference between the first voltage and the second voltage is greater than that between the third voltage and the fourth voltage.

17 Claims, 6 Drawing Sheets

(56) References Cited

U.S. PATENT DOCUMENTS

| | | | | |
|---|---|---|---|---|
| 2021/0012749 | A1* | 1/2021 | Furihata | G09G 5/10 |
| 2021/0257343 | A1 | 8/2021 | Shih | |
| 2022/0319381 | A1* | 10/2022 | Xiao | G09G 3/2074 |
| 2025/0299609 | A1* | 9/2025 | Pyo | G09G 3/2007 |

* cited by examiner

DISPLAY DEVICE WITH FIRST AND SECOND GAMMA VOLTAGE RANGES CORRESPONDING TO FIRST AND SECOND AMBIENT LIGHT RANGES

CROSS REFERENCE TO RELATED APPLICATION

This application claims the benefit of U.S. Provisional Application No. 63/573,480, filed on Apr. 3, 2024. The content of the application is incorporated herein by reference.

BACKGROUND OF THE DISCLOSURE

1. Field of the Disclosure

The present disclosure relates to a display device and particularly to a display device with a broad display brightness range.

2. Description of the Prior Art

With the development of technology, display devices have gradually been applied into all sorts of electronic devices to cater to different requirements from users. However, the ambient light brightness has a vast fluctuation in accordance with a change in environment, for example, a difference between the ambient light brightness of day and that of night, and hence the display brightness range cannot meet the usage requirement. For example, in high ambient light brightness as the sun is shining, even if emission duty ratio has been adjusted to the maximum value, the user may still not see a normal image.

SUMMARY OF THE DISCLOSURE

It is an objective of the present disclosure to provide a display device to enhance display brightness range.

An embodiment of the present disclosure provides a display device including a plurality of light emitting units, an ambient light sensor, and a Gamma voltage controller. The light emitting units are used to provide a plurality of operating modes, and the operating modes include a first operating mode and a second operating mode. The ambient light sensor is used to detect an ambient light brightness, wherein when the ambient light brightness is in a first ambient light brightness range, the light emitting units are operated in the first operating mode, wherein when the ambient light brightness is in a second ambient light brightness range, the light emitting units are operated in the second operating mode, and the ambient light brightness in the first ambient light brightness range is higher than the ambient light brightness in the second ambient light brightness range. The Gamma voltage controller is electrically connected to the light emitting units, and the Gamma voltage controller includes a plurality of Gamma voltage groups. The Gamma voltage groups include a first Gamma voltage group and a second Gamma voltage group, and the first Gamma voltage group and the second Gamma voltage group are respectively provided to the light emitting units in the first operating mode and in the second operating mode. The first Gamma voltage group includes a first voltage and a second voltage respectively corresponding to a lowest gray level and a highest gray level in the first operating mode, the second Gamma voltage group includes a third voltage and a fourth voltage respectively corresponding to a lowest gray level and a highest gray level in the second operating mode, and an absolute value of a difference between the first voltage and the second voltage is greater than an absolute value of a difference between the third voltage and the fourth voltage.

In the display device of the present disclosure, the ambient light brightness may be divided into a plurality of ambient light brightness ranges, and the Gamma voltage controller may provide different Gamma voltage groups in different ambient light brightness ranges, such that the light emitting units may be operated in different operating modes. Therefore, the light emitting units may have different brightness ranges in different ambient light brightness ranges to enhance the display brightness range of the display device.

These and other objectives of the present disclosure will no doubt become obvious to those of ordinary skill in the art after reading the following detailed description of the embodiment that is illustrated in the various figures and drawings.

DETAILED DESCRIPTION

Figure 1:
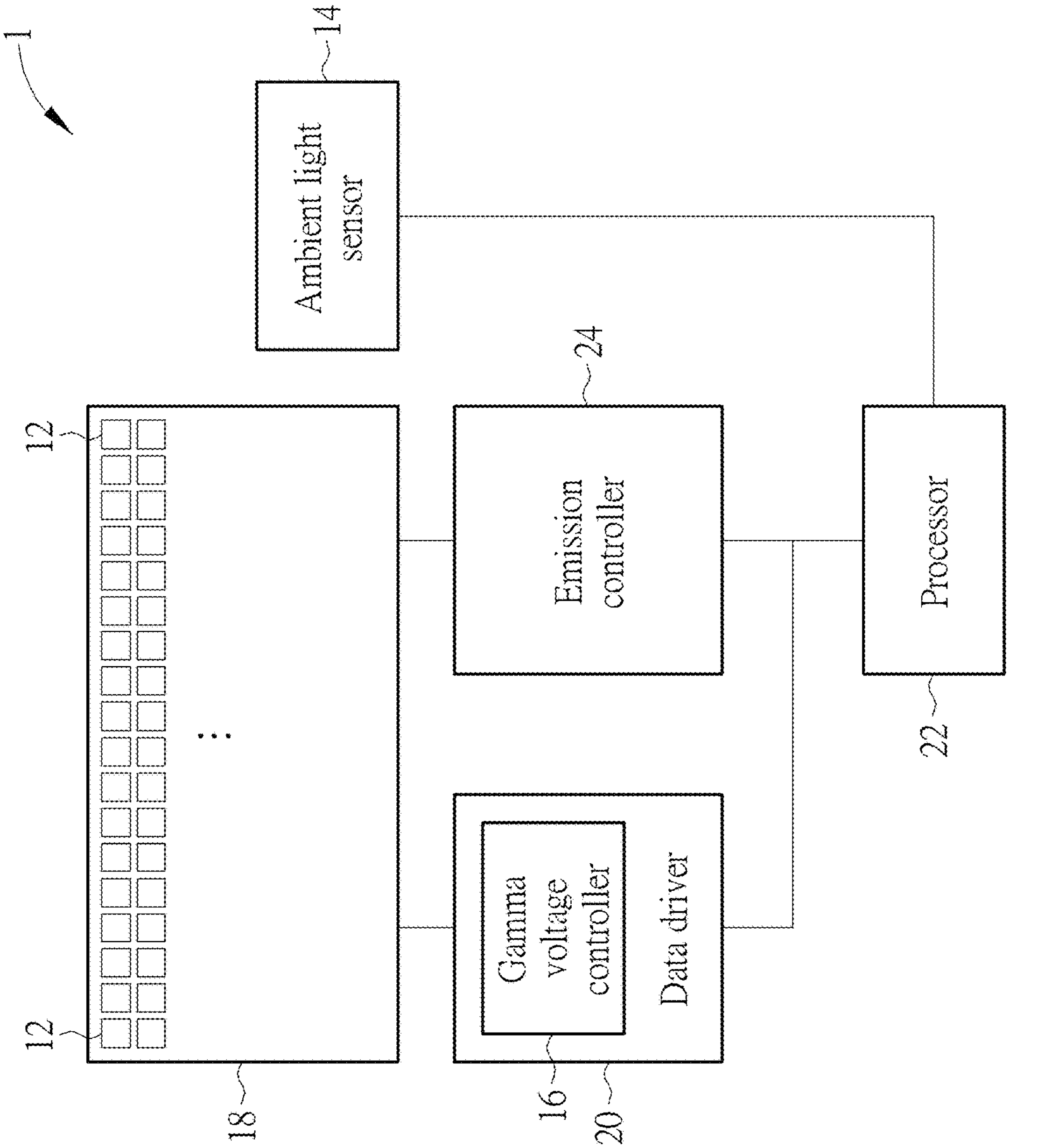
FIG. 1 schematically illustrates a functional block diagram of a display device according to a first embodiment of the present disclosure.

The contents of the present disclosure will be described in detail with reference to specific embodiments and drawings. It is noted that, for purposes of illustrative clarity and ease of understanding by the readers, the following drawings in the present disclosure only illustrate a portion of the device or the structure, and elements therein may not be drawn to scale. The numbers and sizes of the components in the drawings are merely illustrative and are not intended to limit the scope of the present disclosure.

Certain terms are used throughout the specification and the appended claims of the present disclosure to refer to specific components. Those skilled in the art should understand that electronic equipment manufacturers may refer to a component by different names, and this document does not intend to distinguish between components that differ in name but not in function.

In the following specification and claims, the terms "comprise", "include" and "have" are open-ended fashion, so they should be interpreted as "including but not limited to . . . ".

The ordinal numbers used in the specification and the appended claims, such as "first", "second", etc., are used to describe the components of the claims. This does not mean that the component has any previous ordinal numbers, nor does this represent the order of a certain component and another component, or the sequence in a manufacturing method. These ordinal numbers are merely used to make a claimed component with a certain name be clearly distinguishable from another claimed component with the same name.

Spatially relative terms, such as "above", "on", "beneath", "below", "under", "left", "right", "before", "front", "after", "behind" and the like, used in the following embodiments merely refer to the directions in the drawings and are not intended to limit the present disclosure.

In addition, when one component or layer is "on" or "above" another component or layer or is "connected to" the other component or layer, it may be understood that the component or layer is directly on the other component or layer or directly connected to the other component or layer, and alternatively, another component or layer may be between the component or layer and the other component or layer (indirectly). On the contrary, when the component or layer is "directly on" the other component or layer or is "directly connected to" the other component or layer, it may be understood that there is no intervening component or layer between the component or layer and the other component or layer.

The term "electrically connected" includes means of direct or indirect electrical connection. Two elements electrically connected to each other may be in direct contact with each other to transfer electrical signals, and there is no other element between them. Alternatively, two elements electrically connected to each other may be bridged through another element between them to transfer electrical signals. The term "electrically connected" may also be referred to as "coupled".

As disclosed herein, the terms "approximately", "essentially", "about", or "substantially" generally mean within 10%, 5%, 3%, 2%, 1%, or 0.5% of the reported numerical value or range.

It should be understood that, according to the following embodiments, features of different embodiments may be replaced, recombined or mixed to constitute other embodiments without departing from the spirit of the present disclosure. The features of various embodiments may be mixed arbitrarily and used in different embodiments without departing from or conflicting with the spirit of the present disclosure.

In the present disclosure, the length, thickness, width, height, distance, and area may be measured by using an optical microscope (OM), a scanning electron microscope (SEM) or other approaches, but not limited thereto.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a specific definition in the embodiments of the present disclosure.

A display device of the present disclosure may, for example, be applied to any kinds of electronic devices. The electronic device may, for example, include a light emitting device, a sensing device, an antenna device, a touch device, a tiled device, or other suitable electronic devices, but not limited thereto. The display device of the present disclosure may include a light emitting diode, a color conversion layer, other suitable materials, or any combination of the aforementioned materials, but not limited thereto. The electronic device may be a bendable, stretchable, foldable, rollable, and/or flexible electronic device, but not limited thereto. The display device may, for example, be applied to a laptop, a public display, a tiled display, a car display, a touch display, a transparent display, a double-sided display, a virtual reality display, an augmented reality display, a 3D display, a monotone display, a color display, a TV, a monitor, a smartphone, a tablet, a light source module, a lighting equipment, a military equipment, or an electronic device applied to the aforementioned products, but not limited thereto. The display device may, for example, include liquid crystal molecules, a light emitting diode, a color conversion layer, other suitable display media, or a combination of the aforementioned display media, but not limited thereto. The light emitting diode may, for example, include an organic light emitting diode (OLED), a mini light emitting diode (mini LED), a micro light emitting diode (micro LED), or a quantum dot light emitting diode (e.g., QLED or QDLED), but not limited thereto. The light conversion layer may, for example, include a fluorescent material, a phosphor material, a quantum dot (QD), other suitable materials or any combination of elements mentioned above, but not limited thereto. The display device may include a liquid crystal display device, an electro-phoretic display device, or other suitable devices, but not limited thereto. The sensing device may, for example, be a sensing device used for detecting variation in capacitances, light, heat, or ultrasound, but not limited thereto. The sensing device may, for example, include a bio-sensor, a touch sensor, a fingerprint sensor, other suitable sensors, or any combination of the aforementioned sensors. The antenna device may include liquid crystal antenna or antennas of other types, but not limited thereto. The tiled device may, for example, include a tiled display device or a tiled antenna device, but not limited thereto. Furthermore, the appearance of the electronic device may be, for example, rectangular, circular, polygonal, a shape with curved edges, curved or other suitable shapes. The electronic device may have peripheral systems such as a driving system, a control system, a light source system, a shelf system, etc. The electronic device may include electronic units, in which the electronic units may include a passive element and an active element, and for example include a capacitor, a resistor, an inductor, a diode, a transistor, a sensor, etc. It is noted that the electronic device of the present disclosure may be any combination of the above-mentioned devices, but not limited thereto.

Refer to FIG. 1. FIG. 1 schematically illustrates a functional block diagram of a display device according to a first embodiment of the present disclosure. As shown in FIG. 1, the display device 1 includes a plurality of light emitting units 12, an ambient light sensor 14, and a Gamma voltage controller 16. The light emitting units 12 may be used to provide a plurality of operating modes, wherein the operating modes may include a first operating mode and a second operating mode. The ambient light sensor 14 may be used to detect an ambient light brightness, wherein when the ambient light brightness is in a first ambient light brightness range (e.g., the ambient light brightness range R1 shown in FIG.

3), the light emitting units 12 may be operated in the first operating mode; and when the ambient light brightness is in a second ambient light brightness range (e.g., the ambient light brightness range R2 shown in FIG. 3), the light emitting units 12 may be operated in the second operating mode. In addition, the ambient light brightness in the first ambient light brightness range is higher than the ambient light brightness in the second ambient light brightness range. The Gamma voltage controller 16 is electrically connected to the light emitting units 12, and the Gamma voltage controller 16 includes a plurality of Gamma voltage groups, wherein the Gamma voltage groups may include a first Gamma voltage group (e.g., a Gamma voltage group G1 shown in FIG. 2) and a second Gamma voltage group (e.g., a Gamma voltage group G2 shown in FIG. 2). The first Gamma voltage group and the second Gamma voltage group are respectively provided to the light emitting units 12 in the first operating mode and in the second operating mode, wherein the first Gamma voltage group includes a first voltage (e.g., a voltage V1 shown in FIG. 2) and a second voltage (e.g., a voltage V2 shown in FIG. 2) respectively corresponding to a lowest gray level and a highest gray level in the first operating mode, the second Gamma voltage group includes a third voltage (e.g., a voltage V3 shown in FIG. 2) and a fourth voltage (e.g., a voltage V4 shown in FIG. 2) respectively corresponding to a lowest gray level and a highest gray level in the second operating mode, and an absolute value of a difference between the first voltage and the second voltage is greater than an absolute value of a difference between the third voltage and the fourth voltage. It is noted that in different ambient light brightness ranges, the Gamma voltage controller 16 may provide the light emitting units 12 with different Gamma voltage groups, such that the light emitting units 12 may be operated in different operating modes. Hence, the brightness produced by the light emitting units 12 may not be limited to the range of emission duty ratio and may achieve different brightness ranges in different ambient light brightness ranges to increase the display brightness range of the display device 1, such that the usage requirements of the user under different ambient light conditions may be satisfied.

In the present embodiment, the display device 1 may further include a display element 18 used to display an image, and the light emitting units 12 may be included in the display element 18. The light emitting units 12 may, for example, be used as a pixel or a sub-pixel of the display element 18. In other words, the display element 18 may be a self-emissive display panel, but not limited thereto. The light emitting unit 12 may, for example, include a light emitting diode or other types of light emitting element. The light emitting diode may, for example, include an organic light emitting diode (OLED), a mini light emitting diode (mini LED), a micro light emitting diode (micro LED), or a quantum dot light emitting diode (e.g., QLED or QDLED), but not limited thereto. In some embodiments, the light emitting units 12 may optionally include a light gathering structure disposed on the light emitting element to enhance the display brightness of the display device 1.

In some embodiments, when the light emitting unit 12 is used as a pixel or a sub-pixel, the light emitting unit 12 may further include a pixel circuit electrically connected to the corresponding light emitting element to control the emission brightness of the light emitting element by receiving one of voltages of the Gamma voltage groups. For example, each of the pixel circuits may include a switching element, a driving element, an emission control element, a capacitor, or other suitable elements. The switching element, the driving element, and the emission control element may, for example, include thin film transistors, wherein the thin film transistors may, for example, be P-type or N-type.

To clearly illustrate the light emitting units 12, the display element 18 in FIG. 1 neglects other elements, but not limited thereto. In some embodiments, the display element 18 may further include a plurality of signal lines or other suitable elements, wherein the signal lines may, for example, include scanning lines, data lines, emission control signal lines, power lines, or other suitable signal lines to electrically connect the light emitting units 12 to suitable driver and controller. For example, the data lines may be used to electrically connect sources/drains of the switching elements of the light emitting units 12 to a data driver (e.g., the data driver 20 in the following contents), the emission control signal lines may be used to electrically connect gates of the emission control elements of the light emitting units 12 to an emission controller (e.g., the emission controller 24 in the following contents), and the scanning lines may be used to electrically connect gate of the switching elements of the light emitting units 12 to a gate driver, but not limited thereto. In some embodiments, the pixel circuits of the light emitting units 12 and a method of electrically connecting the pixel circuits to the data driver and the emission controller may be adjusted based on requirements, and it is not limited to the aforementioned contents. In this specification or the appended claims, the Gamma voltage groups are "provided to" the light emitting units 12 and/or the light emitting units 12 "receive" the Gamma voltage groups may indicate the light emitting element of the light emitting unit 12 is driven by one of voltages of the Gamma voltage groups. For example, the voltage may be a voltage on a control end of the driving element, such that current passing through and used to drive the light emitting element may vary in accordance with the change of the voltage, so as to control a change in emission brightness of the light emitting element. In some embodiments, the ambient light sensor 14 may, for example, include a photo transistor, a photo diode, or other suitable light sensing element.

As shown in FIG. 1, the display device 1 may include a data driver 20 electrically connected to the light emitting units 12. The data driver 20 may, for example, be electrically connected to the corresponding light emitting units 12 through the corresponding data lines. In the embodiment of FIG. 1, the Gamma voltage controller 16 may be included in the data driver 20, such that the data driver 20 may provide a voltage of one of the Gamma voltage groups of the Gamma voltage controller 16 to the light emitting unit 12, but not limited thereto. Specifically, each of the Gamma voltage groups may include a plurality of voltages, such that the light emitting unit 12 may present different gray levels through different voltages of the same Gamma voltage group in the corresponding operating mode. That is, each of the voltages of the same Gamma voltage group may correspond to a gray level. It is noted that each of the voltages of the Gamma voltage group is a Gamma voltage after Gamma calibration.

In some embodiments, the Gamma voltage controller 16 may be disposed outside the data driver 20, and the data driver 20 is electrically connected between the Gamma voltage controller 16 and the light emitting units 12 and is used to receive Gamma reference voltage information from the Gamma voltage controller 16 to provide suitable voltages to the light emitting units 12.

As shown in FIG. 1, the display device 1 may further include a processor 22 and an emission controller 24, wherein the processor 22 is electrically connected to the ambient light sensor 14, and the emission controller 24 is electrically connected to the processor 22. The processor 22 may be used to determine a target brightness of the display device 1, such that the display brightness of the display device 1 under an operation of highest gray level (i.e., the brightness of a white image) is substantially identical to the target brightness. In other words, the processor 22 may receive an ambient light brightness detected by the ambient light sensor 14 and may determine a corresponding target brightness of the display device 1 based on the detected ambient light brightness, such that the display brightness of the display device 1 may satisfy the user's requirements in the corresponding ambient light brightness. Furthermore, the display device 1 may, for example, be adjusted to have the display brightness corresponding to the highest gray level substantially identical to the target brightness through an inspection device while manufacturing the display device 1. The display brightness and the target brightness of the display device 1 may be further elaborated in the following contents. The processor 22 may, for example, include a micro-processor or other suitable types of integrated circuit chip.

The emission controller 24 may be used to provide an emission duty ratio, for example, the emission controller 24 may generate a pulse signal to control the emission duty ratio. The light emitting units 12 may be electrically connected to the Gamma voltage controller 16 and the emission controller 24, and the light emitting units 12 may be used to receive one of the plurality of the Gamma voltage groups and the emission duty ratio. The emission controller 24 may be electrically connected to the processor 22, and may adjust the light intensity peak value and the corresponding emission duty ratio of the pulse signal by receiving the target brightness determined by the processor 22, such that the light emitting units 12 may produce a brightness that meets the requirements according to the corresponding Gamma voltage group and pulse signal. The adjusting method of the Gamma voltage group and the emission duty ratio may be elaborated in the following contents. For example, the emission controller 24 may be a timing controller, an application processor main board, or other suitable controllers.

Figure 2:
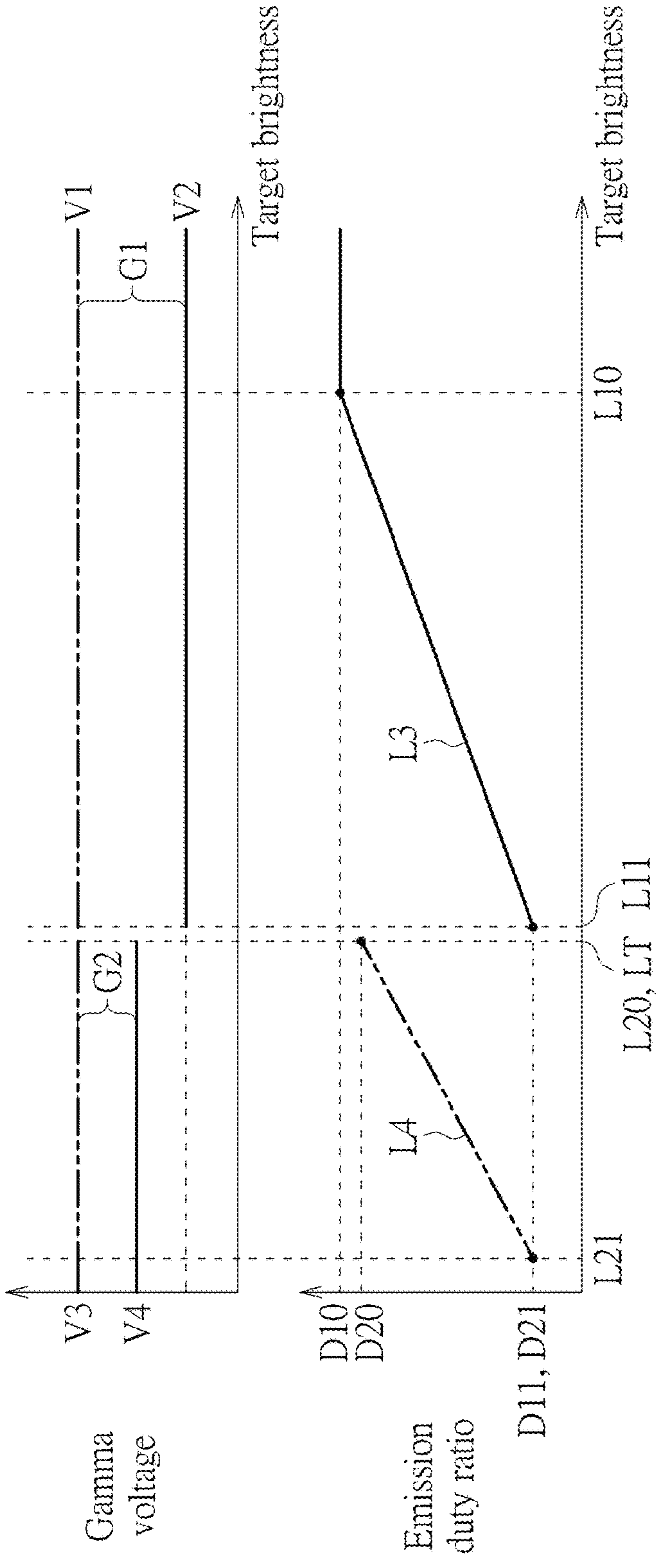
FIG. 2 schematically illustrates a relation between the target brightness and the Gamma voltage of the display device and a relation between the target brightness and the emission duty ratio of the display device according to the first embodiment of the present disclosure.
Figure 3:
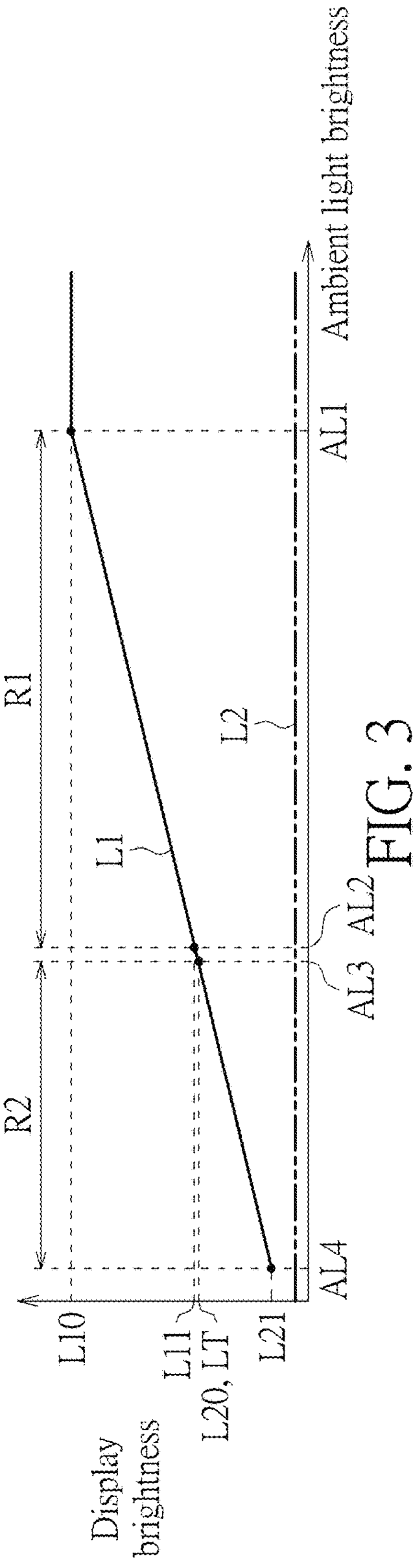
FIG. 3 schematically illustrates a relation between the ambient light brightness and the display brightness of the display device according to the first embodiment of the present disclosure.

Refer to FIG. 2 and FIG. 3. FIG. 2 schematically illustrates a relation between the target brightness and the Gamma voltage of the display device and a relation between the target brightness and the emission duty ratio of the display device according to the first embodiment of the present disclosure, and FIG. 3 schematically illustrates a relation between the ambient light brightness and the display brightness of the display device according to the first embodiment of the present disclosure. As shown in FIG. 3, when the display brightness of the display device 1 is a brightness of all the light emitting units 12 under the operation of the highest gray level, which is when the display device 1 displays a white color, the relation between the display brightness of the display device 1 and the ambient light brightness may be represented by a correlation line L1; and when the display brightness of the display device 1 is a brightness of all the light emitting units 12 under an operation of the lowest gray level, which is when the display device 1 displays a black color, the relation between the display brightness of the display device 1 and the ambient light brightness may be represented by a correlation line L2. In addition, the display brightness of the display device 1 at the highest gray level may vary according to the change in the ambient light brightness, and when the ambient light brightness is maintained in a certain value, the display brightness of the display device 1 under operations of different gray levels may range from a position on the correlation line L2 corresponding to the certain value to a position on the correlation line L1 corresponding to the certain value along a direction of the same ambient light brightness.

As shown in FIG. 1 to FIG. 3, when the ambient light brightness is in an ambient light brightness range R1, the light emitting units 12 may be operated in the first operating mode; and when the ambient light brightness is in an ambient light brightness range R2, the light emitting units 12 may be operated in the second operating mode. Because any ambient light brightness in the ambient light brightness range R1 is higher than any ambient light brightness in the ambient light brightness range R2, the first operating mode may, for example, be a day mode and may be applied to the daytime environment, and the second operating mode may, for example, be a night mode and may be applied to the nighttime environment, but not limited thereto. Under this circumstance, a difference between a maximum ambient light brightness AL1 and a minimum ambient light brightness AL2 in the ambient light brightness range R1 may be greater than a difference between a maximum ambient light brightness AL3 and a minimum ambient light brightness AL4 in the ambient light brightness range R2, but not limited thereto. In this embodiment, the display device 1 may have a threshold brightness LT, and the display brightness of the display device 1 under the operation of the highest gray level may approximately be the target brightness. Hence, the target brightness may be shown as the correlation line L1 in FIG. 3. When the ambient light brightness is in the ambient light brightness range R1, the target brightness may be greater than the threshold brightness LT; and when the ambient light brightness is in the ambient light brightness range R2, the target brightness corresponding to the highest gray level may be less than or equal to the threshold brightness LT, but not limited thereto.

In this embodiment, the target brightness may be in a proportional relation with the ambient light brightness, such that the target brightness and the ambient light brightness may be in a one-to-one relation. That is, a range of the target brightness in the first operating mode (e.g., the brightness L11 to the maximum brightness L10 on the correlation line L1) and a range of the target brightness in the second operating mode (e.g., the minimum brightness L21 to the threshold brightness LT on the correlation line L2) may not overlap, such that the method of determining the target brightness may be simplified, but not limited thereto. In some embodiments, the range of the target brightness in the first operating mode may be partially overlapped with the range of the target brightness in the second operating mode, such that there is a buffer zone in which the range of the target brightness in the first operating mode is changed to the range of the target brightness in the second operating mode or the range of the target brightness in the second operating mode is changed to the range of the target brightness in the first operating mode. That is, when the ambient light brightness in the ambient light brightness range R1/the ambient light brightness range R2 is changed to be in the ambient light brightness range R2/the ambient light brightness range R1 after being in the ambient light brightness range R1/the ambient light brightness range R2 for a period of time, or when a variation of the ambient light brightness over the threshold brightness LT may not exceed a certain value yet, the light emitting units 12 may still be operated in the first operating mode/the second operating mode.

As shown in FIG. 2, the Gamma voltage group G1 includes a voltage V1 and a voltage V2 respectively corresponding to the lowest gray level and the highest gray level in the first operating mode, and each voltage of the Gamma voltage group G1 may respectively correspond to each gray level in the first operating mode. The Gamma voltage group G2 includes a voltage V3 and a voltage V4 respectively corresponding to the lowest gray level and the highest gray level in the second operating mode, and each voltage of the Gamma voltage group G2 may respectively correspond to each gray level in the second operating mode. In the embodiment of FIG. 2, the voltage V2 is less than the voltage V1, and the voltage V4 is less than the voltage V3. Under this condition, the Gamma voltage group G1 and the Gamma voltage group G2 is adapted to the pixel circuit as the thin film transistors are P-type, but not limited thereto. In some embodiments, the voltage V2 may be greater than the voltage V1, and the voltage V4 may be greater than the voltage V3, such that the Gamma voltage group G1 and the Gamma voltage group G2 is adapted to the pixel circuit as the thin film transistors are N-type.

It is noted that, in each of the operating modes, the light emitting units may have N-bit gray levels, wherein N may, for example, be 8 (i.e., 256 gray levels), 10, or other suitable byte. For example, when N is 8, each Gamma voltage group may have 256 voltages. In this embodiment, quantities of the gray levels in different operating modes may be identical to each other. Under this circumstance, since an absolute value of a difference between the voltage V1 and the voltage V2 is greater than an absolute value of a difference between the voltage V3 and the voltage V4, a voltage difference between m-th voltage and (m+1)-th voltage corresponding to the Gamma voltage group G1 may be greater than a voltage difference between m-th voltage and (m+1)-th voltage corresponding to the Gamma voltage group G2, but not limited thereto. In some embodiments, quantities of the gray levels in different operating modes may not be identical to each other, for example, the quantity of gray levels in the first operating mode may be greater than the quantity of the gray levels in the second operating mode, that is the quantity of the gray levels in the first operating mode may, for example, be 256 while the quantity of the gray levels in the second operating mode may, for example, be 128, but not limited thereto.

In the embodiment of FIG. 2 and FIG. 3, the voltage V1 of the Gamma voltage group G1 may be identical to the voltage V3 of the Gamma voltage group G2, but not limited thereto. Under this condition, the correlation line L2 may be a horizontal line. In other words, when the ambient light brightness is in the ambient light brightness range R1 and the ambient light brightness range R2, the display brightness of the display device 1 under the operation of the lowest gray levels in the first operating mode and the second operating mode may be identical to each other.

As shown in FIG. 1 and FIG. 2, when the ambient light brightness is in the ambient light brightness range R1, the relation between the target brightness of the display device 1 and the emission duty ratio may be represented as a correlation line L3; and when the ambient light brightness is in the ambient light brightness range R2, the relation between the target brightness of the display device 1 and the emission duty ratio may be represented as a correlation line L4, but not limited thereto. In other words, the emission duty ratio may be obtained by an algorithm. In some embodiments, the emission duty ratio may alternatively be obtained by a lookup table.

It is known from the correlation line L3 and the correlation line L4 that the emission duty ratio in the same operating mode may vary according to a change in the target brightness, which is the emission duty ratio may be adjusted according to a change in the ambient light brightness, such that the light emitting units 12 may produce different brightness. For the Gamma voltage controller 16 provides the same Gamma voltage group for different target brightness in the same operating mode, the target brightness of the display device 1 in the same operating mode and corresponding to the same gray level may vary according to a change in the emission duty ratio. It is noted that the emission duty ratios may be independent from each other in different operating modes, and hence the emission duty ratio in the first operating mode may be overlapped with the emission duty ratio in the second operating mode. In the embodiment of FIG. 2, the emission duty ratio may be proportional to the target brightness in the same operating mode, and that is, the emission duty ratio may be proportional to the ambient light brightness, but not limited thereto. Therefore, it is known that in the same operating mode, when the ambient light brightness changes, the target brightness of the display device 1 may vary by adjusting the emission duty ratio; and when the ambient light brightness does not change, the display brightness of the display device 1 may be adjusted to a different gray level by providing a different voltage of the same Gamma voltage group.

As shown in FIG. 1 to FIG. 3, it is known from the correlation line L1 that the display device 1 may have a maximum brightness L10 and a minimum brightness L21, and the minimum brightness L21 is greater than 0. When the target brightness of the display device 1 is the maximum brightness L10, the light emitting units 12 may be operated in the first operating mode and receive the Gamma voltage group G1 provided by the Gamma voltage controller 16, and the emission duty ratio provided by the emission controller 24 may be an emission duty ratio D10. When the target brightness of the display device 1 is the minimum brightness L21, the light emitting units 12 may be operated in the second operating mode and receive the Gamma voltage group G2 provided by the Gamma voltage controller 16, and the emission duty ratio provided by the emission controller 24 may be an emission duty ratio D21. The emission duty ratio D10 may be greater than the emission duty ratio D21, and the emission duty ratio D21 may be greater than 0 (i.e., D10>D21>0). In addition, the minimum brightness L21 may be less than the threshold brightness LT, and the threshold brightness LT may be less than the maximum brightness L10.

It is noted that a ratio of the minimum brightness L21 to the maximum brightness L10 is less than a ratio of the emission duty ratio D21 to the emission duty ratio D10. In other words, the brightness range from the maximum brightness L10 to the minimum brightness L21 does not match with the range of the emission duty ratios, such that the brightness range from the maximum brightness L10 to the minimum brightness L21 may not be realized by only adjusting the emission duty ratio and may be achieved by adjusting the emission duty ratio in combination with different Gamma voltage groups.

Furthermore, when the target brightness of the display device 1 is greater than the threshold brightness LT and less than the maximum brightness L10, the light emitting units 12 may be operated in the first operating mode and receive the Gamma voltage group G1 provided by the Gamma voltage controller 16, and the emission duty ratio provided by the emission controller 24 may be less than the emission duty ratio D10. Under this condition, the emission duty ratio provided by the emission controller 24 may, for example, be an emission duty ratio D11 or may be any emission duty ratio between the emission duty ratio D10 and the emission duty ratio D11. Taking the emission duty ratio being calculated through the algorithm for example, in the first operating mode, the emission duty ratio may, for example, approximately be a product of the ratio of the corresponding target brightness of the display device 1 to the maximum brightness L10 multiplied by the emission duty ratio D10. For instance, when the target brightness is a brightness L11 on the correlation line L1, the light emitting units 12 may receive the emission duty ratio D11 and the corresponding Gamma voltage group G1. The emission duty ratio D11 is approximately a product of the ratio of the brightness L11 to the maximum brightness L10 multiplied by the emission duty ratio D10 (i.e., $(L11/L10)\times D10$), but not limited thereto. In the present disclosure, the product calculated by the algorithm may have an error within 20%, and that is, the desired calculated emission duty ratio may be within the range from the calculated product minus 20% of itself to the calculated product plus 20% of itself. For example, the emission duty ratio D11 may be in the range of $(L11/L10)\times D10\times(1-20\%)$ to $(L11/L10)\times D10\times(1+20\%)$. The brightness L11 may, for example, be the lowest target brightness as the light emitting units 12 are operated in the first operating mode, and hence, when the ambient light brightness is in the ambient light brightness range R1, the target brightness of the display device 1 may range from the brightness L11 to the maximum brightness L10. In other words, when the ambient light brightness is the maximum ambient light brightness AL1 in the ambient light brightness range R1, the target brightness may be the maximum brightness L10; and when the ambient light brightness is the minimum ambient light brightness AL2 in the ambient light brightness range R1, the target brightness may be the brightness L11, but not limited thereto.

When the target brightness of the display device 1 is greater than the minimum brightness L21 and less than or equal to the threshold brightness LT, the light emitting units 12 may be operated in the second operating mode and receive the Gamma voltage group G2 provided by the Gamma voltage controller 16, and the emission duty ratio provided by the emission controller 24 may be greater than the emission duty ratio D21. Under this condition, the emission duty ratio provided by the emission controller 24 may, for example, be an emission duty ratio D20 or any emission duty ratio between the emission duty ratio D21 and the emission duty ratio D20. In the second operating mode, the emission duty ratio may, for example, approximately be a product of the ratio of the corresponding target brightness of the display device 1 to the minimum brightness L21 multiplied by the emission duty ratio D21. For instance, when the target brightness is a brightness L20 on the correlation line L1, the light emitting units 12 may receive the emission duty ratio D20 and the corresponding Gamma voltage group G2. The emission duty ratio D20 is approximately a product of the ratio of the brightness L20 to the minimum brightness L21 multiplied by the emission duty ratio D21 (i.e., $(L20/L21)\times D21$), but not limited thereto. For example, the emission duty ratio D20 may be in the range of $(L20/L21)\times D21\times(1-20\%)$ to $(L20/L21)\times D21\times(1+20\%)$. The brightness L20 may, for example, be the highest target brightness as the light emitting units 12 are operated in the second operating mode, and hence, when the ambient light brightness is in the ambient light brightness range R2, the target brightness of the display device 1 may range from the minimum brightness L21 to the brightness L20. In other words, when the ambient light brightness is the maximum ambient light brightness AL3 in the ambient light brightness range R2, the target brightness may be the brightness L20; and when the ambient light brightness is the minimum ambient light brightness AL4 in the ambient light brightness range R2, the target brightness may be the minimum brightness L21, but not limited thereto. In this embodiment, the brightness L20 may be identical to the threshold brightness LT, such that a ratio of the target brightness to the ambient light brightness of the display device 1 in the ambient light brightness range R1 may be approximately identical to that in the ambient light brightness range R2 so as to reduce a brightness difference of the display device 1 while switching the operating modes of the display device 1, which enhances the comfort of the user, but not limited thereto.

In this embodiment, the emission duty ratio D10 corresponding to the maximum brightness L10 may be greater than or equal to an emission duty ratio D20 corresponding to the threshold brightness LT. It is noted that since the target brightness of the brightness L20 is produced by the light emitting units 12 receiving the emission duty ratio D20 and the voltage V4, the value of the emission duty ratio D20 may be adjusted according to the value of the voltage V4. For example, the identical brightness L20 may be produced in a way of reducing (or increasing) the emission duty ratio D20 and increasing (or reducing) the voltage V4.

As shown in FIG. 2, a ratio of a difference between the emission duty ratio D10 and the emission duty ratio D11 to a difference between the maximum brightness L10 and the threshold brightness LT may be less than a ratio of a difference between the emission duty ratio D20 and the emission duty ratio D21 to a difference between the threshold brightness LT and the minimum brightness L21 (i.e., $(D10-D11)/(L10-LT)<(D20-D21)/(LT-L21)$). In other words, with the same change in the target brightness or in the ambient light brightness, the variation of the emission duty ratio in the first operating mode will be less than the variation of the emission duty ratio in the second operating mode.

In some embodiment, the emission duty ratio D11 is greater than or equal to the emission duty ratio D21, but not limited thereto.

Figure 4:
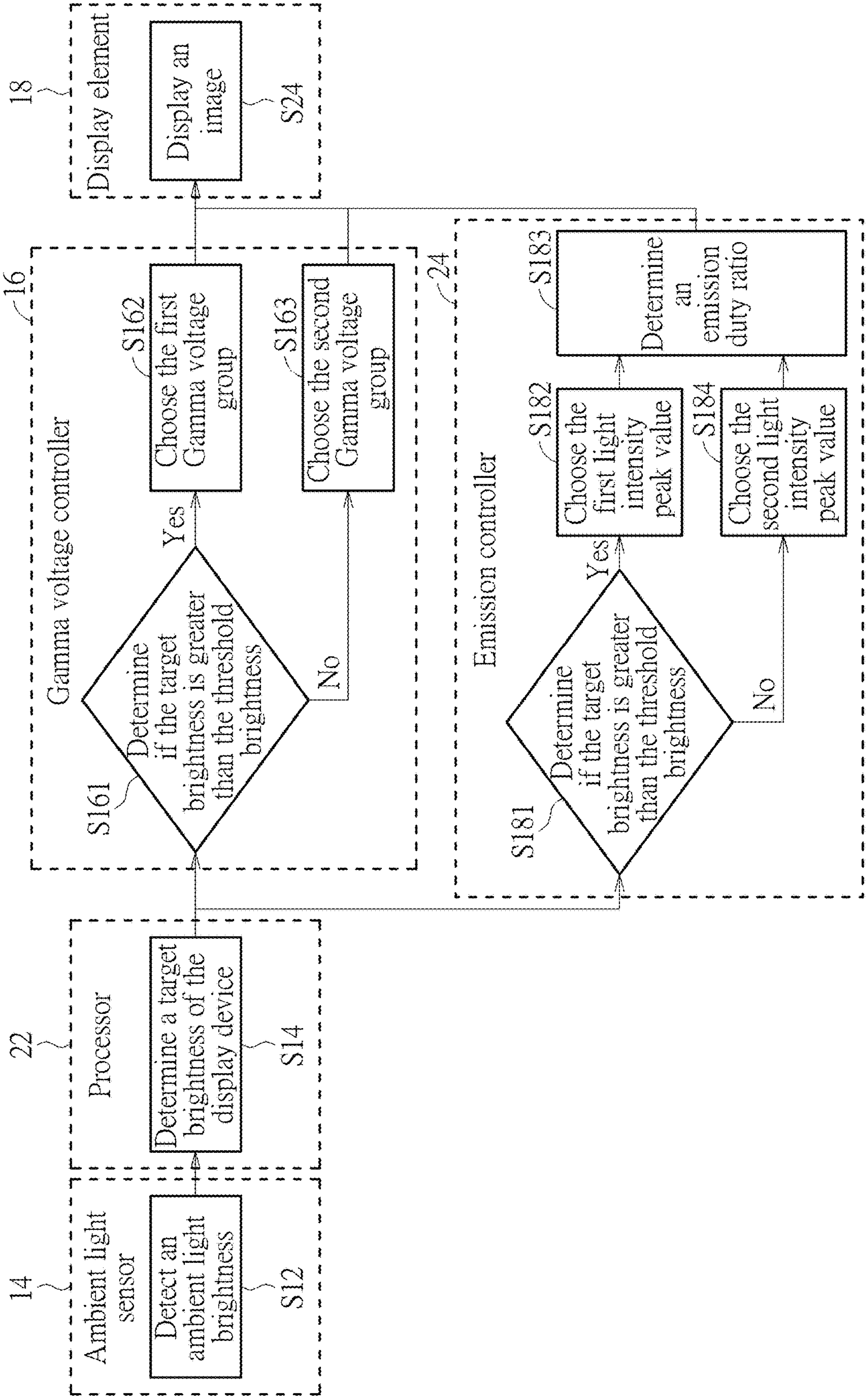
FIG. 4 schematically illustrates an operating method of a display device according to the first embodiment of the present disclosure.

Refer to FIG. 4. FIG. 4 schematically illustrates an operating method of a display device according to the first embodiment of the present disclosure. As shown in FIG. 4, the operating method of the display device 1 provided by this embodiment may include the following step S12 to step S14, step S161 to step S163, step S181 to step S184, and step 24, and may be further described in the following contents with reference to FIG. 1 to FIG. 3. In FIG. 4, in order to clearly describe, each element is represented by dashed block and encircles the corresponding step on which it performs, but not limited thereto.

As shown in FIG. 1 to FIG. 4, firstly, in step S12, the display device 1 may detect the ambient light brightness by the ambient light sensor 14 and may transmit the information of the ambient light brightness to the processor 22. Then, step S14 is performed that the processor 22 determines the target brightness of the display device 1 based on the received information of the ambient light brightness, and transmits the information of the target brightness to the Gamma voltage controller 16 and the emission controller 24. For example, the processor 22 may perform the algorithm or equation operations, search the lookup table, or perform other suitable methods based on the received ambient light brightness to determine the target brightness.

In this embodiment, after step S14, step 161 may be performed to, for example, determine if the target brightness is greater than the threshold brightness LT by the Gamma voltage controller 16. When the target brightness is greater than the threshold brightness LT, step S162 is performed to choose the first operating mode and the Gamma voltage group G1 corresponding to the first operating mode, and to provide the Gamma voltage group G1 to the light emitting units 12. Under this circumstance, the light emitting units 12 may be operated in the first operating mode. When the target brightness is not greater than (or less than or equal to) the threshold brightness LT, step S163 is performed to choose the second operating mode and the Gamma voltage group G2 corresponding to the second operating mode, and to provide the Gamma voltage group G2 to the light emitting units 12. Under this circumstance, the light emitting units 12 may be operated in the second operating mode. In other words, by determining the value of the target brightness, the operating mode in which the light emitting units 12 are operated may be determined. For example, the data driver 20 may further choose the corresponding voltage from the Gamma voltage group G1 or the Gamma voltage group G2 based on the gray level of the desired display image and the determined operating mode, and may provide the corresponding voltage to the light emitting units 12.

After step S14, step S181 is performed, such that the emission controller 24 may also determine if the target brightness is greater than the threshold brightness LT. When the target brightness is greater than the threshold brightness LT, step S182 is performed to choose the first operating mode and a corresponding first light intensity peak value, such as the first light intensity peak value LP1 shown in FIG. 5. Afterwards, the emission controller 24 performs step S183 to determine the corresponding emission duty ratio as the target brightness is in the first operating mode, and to provide the corresponding emission duty ratio to the light emitting units 12. Under this circumstance, the light emitting units 12 may be operated in the first operating mode. When the target brightness is not greater than (or less than or equal to) the threshold brightness LT, step S184 is performed to choose the second operating mode and a corresponding second light intensity peak value, such as the second light intensity peak value LP2 shown in FIG. 5. Afterwards, the emission controller 24 performs step S184 to determine the corresponding emission duty ratio as the target brightness is in the second operating mode, and to provide the corresponding emission duty ratio to the light emitting units 12. Under this circumstance, the light emitting units 12 may be operated in the second operating mode. The emission duty ratio may, for example, be determined by an algorithm, a lookup table, or other suitable methods. Besides, in the same operating mode, the light intensity peak value of the target brightness may, for example, be determined by an algorithm, a lookup table, or other suitable methods. For example, the emission controller 24 may choose the first operating mode (or the second operating mode) based on the judgment, and may further choose the first light intensity peak value LP1 of the target brightness corresponding to the first operating mode (or the second light intensity peak value LP2 of the target brightness corresponding to the second operating mode) by an algorithm or a lookup table.

In some embodiments, since step S161 and step S181 are identical to each other, they may be merged into the same step and may be performed in the processor 22, and the processor 22 may transmit the judgment to the Gamma voltage controller 16 and the emission controller 24. Under this condition, when the target brightness is greater than the threshold brightness LT, the Gamma voltage controller 16 and the emission controller 24 may separately perform step S162 and step S182. When the target brightness is not greater than (or less than or equal to) the threshold brightness LT, the Gamma voltage controller 16 and the emission controller 24 may separately perform step S163 and step S184.

In some embodiments, the emission controller 24 may optionally not perform step S181. Under this circumstance, when the target brightness is greater than the threshold brightness LT, the Gamma voltage controller 16 may perform step S162 in advance and may provide the chosen first operating mode to the emission controller 24. In addition, step S182 may be performed after step S162 to choose the first light intensity peak value corresponding to the first operating mode. Then, the emission controller 24 perform step S183 to determine the corresponding emission duty ratio as the target brightness is in the first operating mode, and the emission controller 24 provides the corresponding emission duty ratio to the light emitting units 12. When the target brightness is not greater than (or less than or equal to) the threshold brightness LT, the Gamma voltage controller 16 may perform step S163 in advance and may provide the chosen second operating mode to the emission controller 24. In addition, step S184 may be performed after step S163 to choose the second light intensity peak value corresponding to the second operating mode. Then, the emission controller 24 perform step S183 to determine the corresponding emission duty ratio as the target brightness is in the second operating mode, and the emission controller 24 provides the corresponding emission duty ratio to the light emitting units 12.

In the case that the emission duty ratio is determined by the algorithm, taking the threshold brightness LT being the brightness L20 for example, when the target brightness is greater than the brightness L20, the emission duty ratio may be the product of the ratio of the target brightness to the maximum brightness L10 multiplied by the emission duty ratio D10 corresponding to the maximum brightness L10, but not limited thereto. When the target brightness is less than or equal to the brightness L20, the emission duty ratio may be the product of the ratio of the target brightness to the minimum brightness L21 multiplied by the emission duty ratio D21 corresponding to the minimum brightness L21. Or, when the target brightness is greater than the product of the ratio of the emission duty ratio D20 to the emission duty ratio D21 multiplied by the minimum brightness L21, the emission duty ratio may the product of the ratio of the target brightness to the maximum brightness L10 multiplied by the emission duty ratio D10 corresponding to the maximum brightness L10; and when the target brightness is less than or equal to the product of the ratio of the emission duty ratio D20 to the emission duty ratio D21 multiplied by the minimum brightness L21, the emission duty ratio may be the product of the ratio of the target brightness to the minimum brightness L21 multiplied by the emission duty ratio D21 corresponding to the minimum brightness L21. In some embodiments, in the case that the emission duty ratio is determined by searching the lookup table, when the target brightness is greater than the brightness L20, the emission duty ratio may be a value ranging from the emission duty ratio D11 to the emission duty ratio D10 by searching the lookup table; and when the target brightness is less than or equal to the brightness L20, the emission duty ratio may be a value ranging from the emission duty ratio D21 to the emission duty ratio D20 by searching the lookup table. Or, when the target brightness is greater than the product of the ratio of the emission duty ratio D20 to the emission duty ratio D21 multiplied by the minimum brightness L21, the emission duty ratio may be a value ranging from the emission duty ratio D11 to the emission duty ratio D10 by searching the lookup table; and when the target brightness is less than or equal to the product of the ratio of the emission duty ratio D20 to the emission duty ratio D21 multiplied by the minimum brightness L21, the emission duty ratio may be a value ranging from the emission duty ratio D21 to the emission duty ratio D20 by searching the lookup table, but not limited thereto.

Afterwards, step S24 is performed, such that the light emitting units 12 of the display element 18 may display images through the received voltages, the received light intensity peak value, and the received emission duty ratio, and hence, the display device 1 may present the required display brightness.

Figure 5:
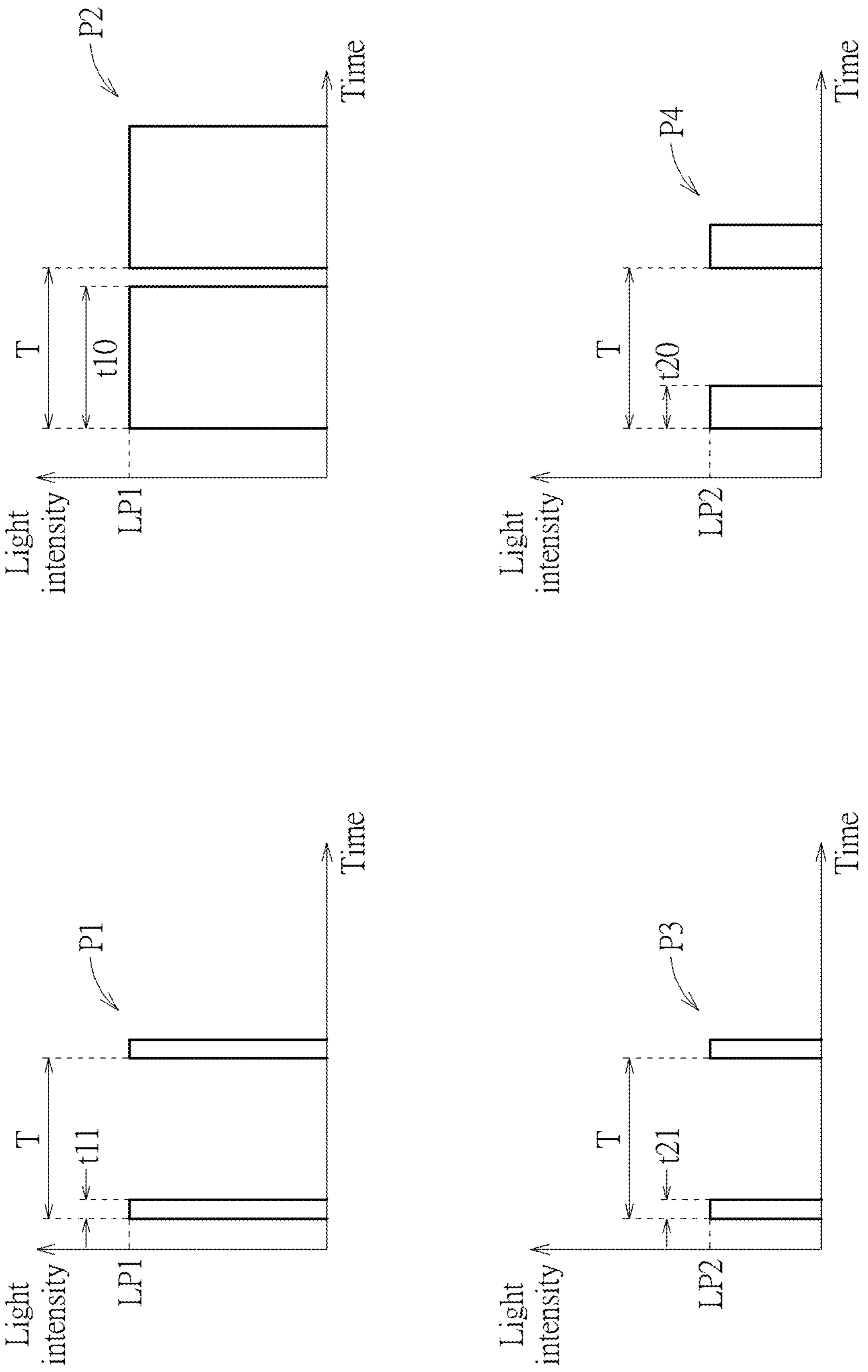
FIG. 5 schematically illustrates light pulses forming the target brightness and generated by the light emitting units operated in different operating modes and under different ambient light brightness according to the first embodiment of the present disclosure.

Refer to FIG. 5. FIG. 5 schematically illustrates light pulses forming the target brightness and generated by the light emitting units operated in different operating modes and under different ambient light brightness according to the first embodiment of the present disclosure. As shown in FIG. 5, a light pulse P1 and a light pulse P2 may respectively represent the light pulses forming the target brightness that are generated by the light emitting units (e.g., the light emitting units 12 shown in FIG. 1) operated in the first operating mode and under different ambient light brightness, and for example, may be respectively used to produce the brightness L11 and the maximum brightness L10 in FIG. 3. Because the light pulse P1 and the light pulse P2 correspond to the same operating mode, the light pulse P1 and the light pulse P2 may have the identical first light intensity peak value LP1, and that is, in the first operating mode, the target brightness corresponding to different ambient light brightness may have the same first light intensity peak value LP1. The difference between the light pulse P1 and the light pulse P2 is that the light pulse P1 may have an emission time t11 in an emission period T while the light pulse P2 may have an emission time t10 in the emission period T, and the emission time t10 is greater than the emission time t11. A ratio of the emission time t11 to the emission period T may be the emission duty ratio corresponding to the brightness L11 (such as the emission duty ratio D11 in FIG. 3), and a ratio of the emission time t10 to the emission period T may be the emission duty ratio corresponding to the maximum brightness L10 (such as the emission duty ratio D10 in FIG. 3). In other words, the brightness produced by the light pulse P2 is increased by prolonging the emission time in the emission period T or by increasing the emission duty ratio. Therefore, it is known that in the same operating mode, the target brightness of the display device (e.g., the display device 1 shown in FIG. 1) may be altered by adjusting the emission duty ratio.

It is noted that the target brightness is approximately identical to the display brightness when the light emitting units are operated at the highest gray level, so that the light pulse P1 and the light pulse P2 shown in FIG. 5 are the highest gray level brightness produced by the light emitting units in the first operating mode based on the received voltage V2 of the Gamma voltage group G1. When the Gamma voltage controller (e.g., the Gamma voltage controller 16 shown in FIG. 1) provides other voltages in the Gamma voltage group G1 to the light emitting units, the light intensity peak value of the light pulse (e.g., the light pulse P1 or the light pulse P2) produced by the light emitting units may be reduced to produce non-highest gray level brightness.

A light pulse P3 and a light pulse P4 may respectively represent the light pulses forming the target brightness that are generated by the light emitting units operated in the second operating mode and under different ambient light brightness, and for example, may be respectively used to produce the brightness L20 and the minimum brightness L21 in FIG. 3. In the second operating mode, the target brightness corresponding to different ambient light brightness may have the same second light intensity peak value LP2, and hence, similar to the light pulse P1 and the light pulse P2, the light pulse P3 and the light pulse P4 may have the identical second light intensity peak value LP2. In addition, the light pulse P3 may have an emission time t21 in the emission period T while the light pulse P4 may have an emission time t20 in the emission period T, wherein the emission time t20 is greater than the emission time t21. Hence, in the second operating mode, the brightness produced by the light pulse P3 and the light pulse P4 may be also increased by prolonging the emission time in the emission period T or by increasing the emission duty ratio. It is noted that in different operating modes, the first light intensity peak value LP1 of the light pulse P1 and the light pulse P2 is different from the second light intensity peak value LP2 of the light pulse P3 and the light pulse P4, such that the brightness L11 and the maximum brightness L10 may be greater than the brightness L20 and the minimum brightness L21. Hence, the pair of the light pulse P1 and the light pulse P2 and the pair of the light pulse P3 and the light pulse P4 may be respectively used in different operating modes. Besides, the light pulse P3 and the light pulse P4 shown in FIG. 5 both are the highest gray level brightness produced by the light emitting units in the second operating mode based on the received voltage V4 of the Gamma voltage group G2. When the Gamma voltage controller provides other voltages in the Gamma voltage group G2 to the light emitting units, the light intensity peak values of the light pulses (e.g., the light pulse P3 or the light pulse P4) produced by the light emitting units may be reduced to produce non-highest gray level brightness. Therefore, the light emitting units may produce the required brightness by the received voltage of the Gamma voltage group, the received light intensity peak value, and the emission duty ratio.

In some embodiments, the Gamma curve corresponding to the first operating mode may be identical to the Gamma curve corresponding to the second operating mode, but not limited thereto. For example, a ratio of a difference between a certain gray level brightness and the lowest gray level brightness to a difference between the highest gray level brightness and the lowest gray level brightness produced by the light emitting units in the first operating mode may be identical to the ratio of the difference between the certain gray level brightness and the lowest gray level brightness to the difference between the highest gray level brightness and the lowest gray level brightness produced by the light emitting units in the second operating mode.

For instance, in the second operating mode, the emission duty ratio D20 corresponding to the brightness L20 may approximately be 0.7%, and the emission duty ratio D21 corresponding to the minimum brightness L21 may approximately be 0.2%, such that the brightness L20 and the minimum brightness L21 may be approximately 171 nits and approximately 50 nits respectively. In the first operating mode, the emission duty ratio D11 corresponding to the brightness L11 may approximately be 0.2%, and the emission duty ratio D10 corresponding to the maximum brightness L10 may approximately be 998, such that the brightness L11 is approximately greater than 171 nits, and the maximum brightness L10 is approximately 85000 nits, but not limited thereto.

Figure 6:
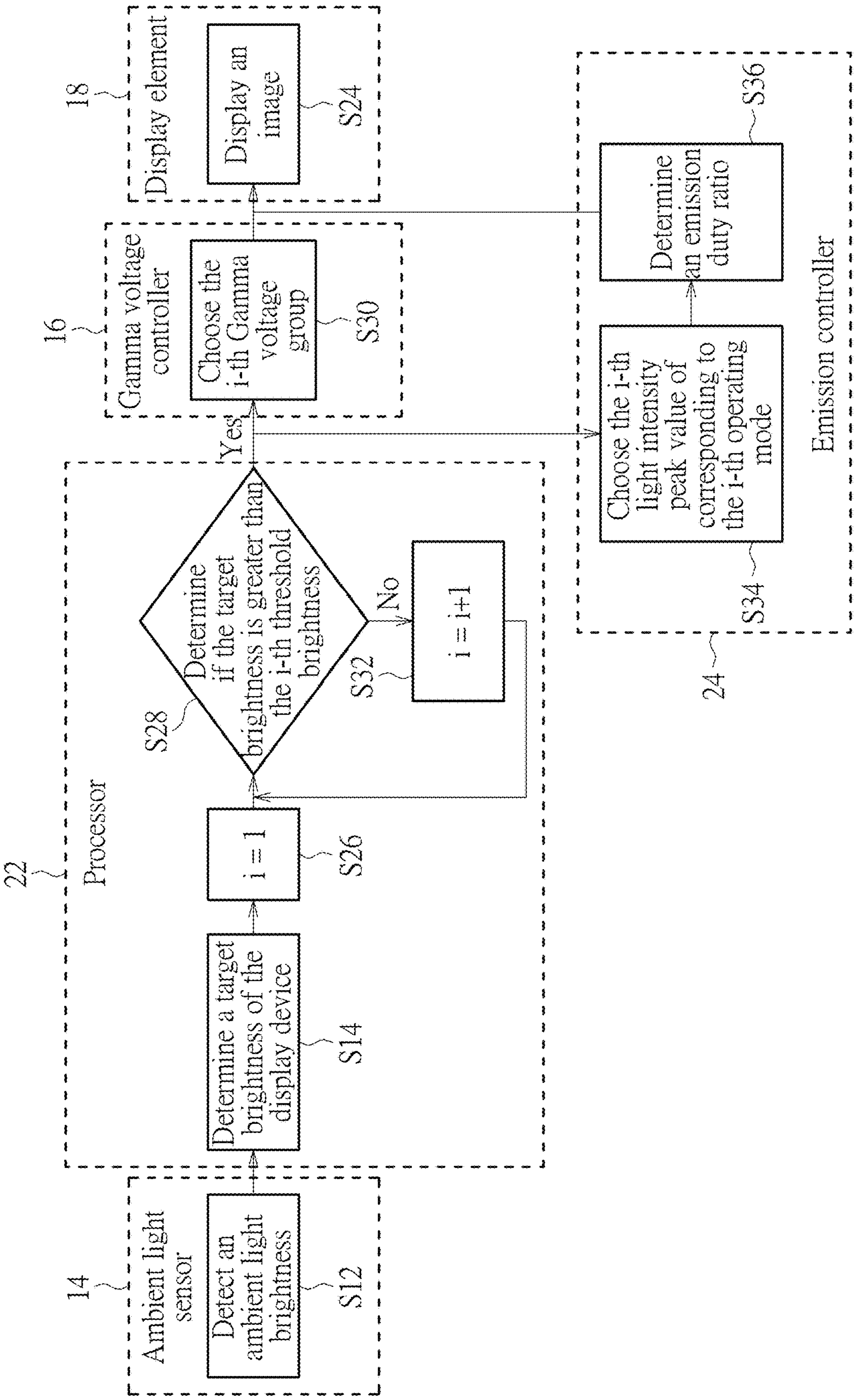
FIG. 6 schematically illustrates an operating method of a display device according to a modified embodiment of the first embodiment of the present disclosure.

The quantity of the ambient light brightness ranges divided by the present disclosure is not limited to two and may be greater than two. Refer to FIG. 6. FIG. 6 schematically illustrates an operating method of a display device according to a modified embodiment of the first embodiment of the present disclosure. In FIG. 6, for clarity, each element is represented with dashed lines and encircles the corresponding step on which it performs, but not limited thereto. As shown in FIG. 6, in this modified embodiment, the quantity of the ambient light brightness ranges may be n, such that the light emitting units may have n operating modes. Under this circumstance, the display device may have n threshold brightness, and the Gamma voltage controller 16 may include n Gamma voltage groups, wherein n is a positive integer greater than or equal to 2. In addition, when the detected ambient light is in an i-th ambient light brightness range, the Gamma voltage controller 16 may provide an i-th Gamma voltage group to the light emitting units of the display element 18, and the emission controller 24 still provides the corresponding emission duty ratio to the light emitting units of the display element 18, wherein i is one of 1 to n. It is noted that as i is bigger, the ambient light brightness range is lower, which is the i-th ambient light brightness range is higher than the (i+1)-th ambient light brightness range.

As shown in FIG. 6, a difference between the operating method of this modified embodiment and the operating method of FIG. 4 is that the operating method of this modified embodiment replaces step S161 to step S163 and step S181 to step S184 of FIG. 4 with step S26 to step S36. Specifically, the operating method of this modified embodiment may include step S12, step S14, and step S24 to step S36. Since step S12, step S14, and step S24 of this modified embodiment may be identical to that in the embodiment of FIG. 4, refer to the aforementioned contents for them, and they will not be detailed redundantly herein.

In this modified embodiment, after step S14, step S26 may be performed by the processor 22 to set i=1. Then, step S28 is performed to determine if the target brightness is greater than the i-th threshold brightness by the processor 22. When the target brightness is greater than the i-th threshold brightness, the processor 22 may transmit the judgment to the Gamma voltage controller 16 and the emission controller 24, and step S30 and step S34 are individually performed. In step S30, the Gamma voltage controller 16 chooses the i-th Gamma voltage group corresponding to an i-th operating mode and provides the i-th Gamma voltage group to the light emitting units of the display element 18. Under this condition, the light emitting units may be operated in the i-th operating mode. In step S34, the emission controller 24 chooses the i-th light intensity peak value corresponding to the i-th operating mode. After step S34, step S36 may be performed, such that the emission controller 24 determines the emission duty ratio corresponding to the target brightness in the i-th operating mode and provides the i-th light intensity peak value and the emission duty ratio to the light emitting units of the display element 18.

When the target brightness is not greater than (or less than or equal to) the i-th threshold brightness, the processor 22 may perform step S32 to set i=i+1, and then, step S28 may be performed repetitively until the target brightness is greater than the corresponding i-th threshold brightness. For example, when the target brightness is less than the first threshold brightness, i=2 will be set in step S32 to perform step S28 repetitively and determine if the target brightness is greater than the second threshold brightness, and so on and so forth. It is worth noting that the n-th threshold brightness may, for example, be zero or less than the minimum brightness of the display device, such that the range of the target brightness corresponding to the n-th ambient light brightness range may be from the minimum brightness to the (n−1)-th threshold brightness. Hence, by setting a plurality of threshold brightness and a plurality of Gamma voltage groups, it may aid in dividing the ambient brightness to a plurality of ranges to enhance comfort of the observer.

In some embodiments, step S34 may alternatively be performed after step S30, which is the Gamma voltage controller 16 may provide the chosen i-th operating mode to the emission controller 24, and the emission controller 24 may choose the i-th light intensity peak value corresponding to the i-th operating mode based on the i-th operating mode. Then, step S36 is performed, such that the emission controller 24 determines the emission duty ratio corresponding to the target brightness in the i-th operating mode and provides the i-th light intensity peak value and the emission duty ratio to the light emitting units of the display element 18.

In some embodiments, step S26, step S28, and step S32 may alternatively be performed in both the Gamma voltage controller 16 and the emission controller 24. That is, after step S14 of the processor 22 determining the target brightness, the processor 22 may transmit the information of the target brightness to the Gamma voltage controller 16 and the emission controller 24. Then, the Gamma voltage controller 16 may perform step S26, step S28, and step S32. When the target brightness is greater than the i-th threshold brightness, step S30 is performed, and the i-th Gamma voltage group is provided to the light emitting units of the display element 18. The emission controller 24 may also perform step S26, step S28, and step S32. When the target brightness is greater than the i-th threshold brightness, step S34 and step S36 are performed, and the i-th light intensity peak value and the emission duty ratio are provided to the light emitting units of the display element.

The display device and the operating method thereof of the present disclosure are not limited to the above-mentioned embodiments and may have other embodiments. To simplify description, other embodiments in the following contents will use the same notations to the same elements from the above-mentioned embodiments. To clearly clarify other embodiments, the following contents will emphasize on the difference between other embodiments and the above-mentioned embodiments, and will not further elaborate for the repeated part.

Figure 7:
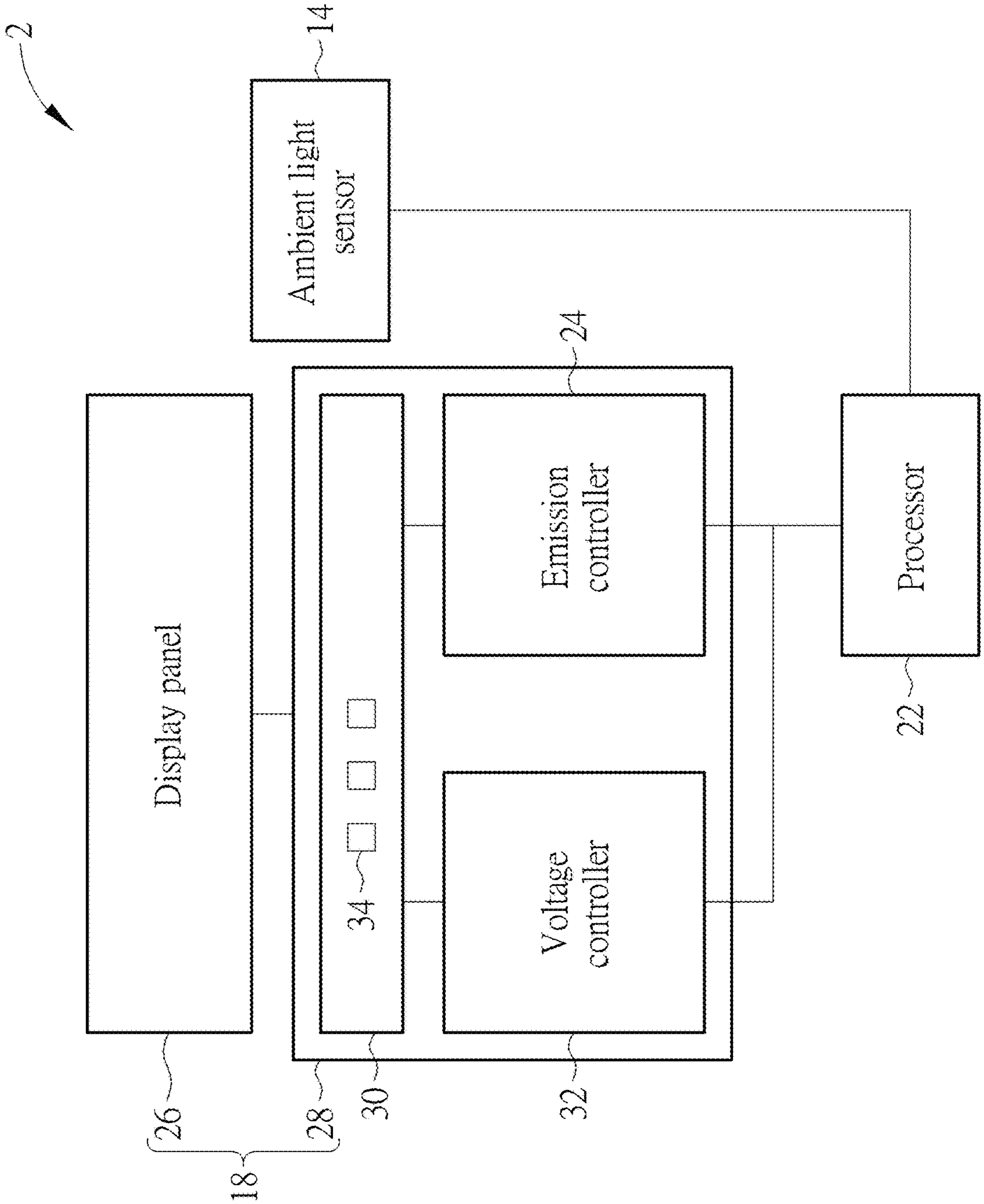
FIG. 7 schematically illustrates a functional block diagram of a display device according to a second embodiment of the present disclosure.

Refer to FIG. 7. FIG. 7 schematically illustrates a functional block diagram of a display device according to a second embodiment of the present disclosure. As shown in FIG. 7, a difference between the display device 2 and the display device 1 of FIG. 1 is that the display device 2 of this embodiment may be a non-self-emissive display device. In details, the display element 18 may include a display panel 26 and a backlight module 28. The display panel 26 is a non-self-emissive display panel, such as a liquid crystal display panel or other suitable display panels. The backlight module 28 is used to produce a backlight emitted into the display panel 26, which is used as a light source of the display panel 26.

In this embodiment, the backlight module 28 may include a light emitting module 30, a voltage controller 32, and the emission controller 24. The light emitting module 30 may be used to produce light, wherein the light emitting module 30 may include a plurality of light emitting elements 34. The light emitting element 34 may be identical or similar to the light emitting element of the light emitting units 12, and hence, it may refer to the aforementioned contents and will not be detailed redundantly herein. A position of the light emitting elements 34 of the light emitting module 30 relative to the display panel 26 may depend on the type of the backlight module 28. For example, the backlight module 28 may be a direct-lit type or a side-lit type.

As shown in FIG. 7, the voltage controller 32 may be electrically connected to the light emitting module 30 and may include a plurality of voltages, such that the voltage controller 32 may provide one of the voltages to the light emitting module 30 based on the detected ambient light brightness. For example, the voltages may include a voltage and another voltage respectively provided to the light emitting elements 34 of the backlight module 30 in the first operating mode and the second operating mode, and the voltage of the first operating mode is greater than the voltage of the second operating mode. The two voltages may, for example, respectively be 3.3 V and 2.7V. The ambient light brightness ranges corresponding to the first operating mode and the second operating mode may be identical to the aforementioned embodiments, and hence, refer to the aforementioned contents for them, and they will not be detailed redundantly herein.

The emission controller 24 of this embodiment may be used to provide the emission duty ratio and may be identical to the emission controller 24 of FIG. 1, and hence, it may refer to the aforementioned contents and will not be detailed redundantly herein. The light emitting elements 34 of the light emitting module 30 may produce a brightness that meets the requirements based on the corresponding voltage and the emission duty ratio, such that the target brightness of the display device 2 may be adjusted according to the change in the ambient light brightness.

In some embodiments, the voltage controller 32 may alternatively adopt the operating method of FIG. 6 and may include n voltages respectively correspond to the n operating modes and n ambient light brightness ranges. Under this circumstance, the operating method of the display device 2 may be similar to that in FIG. 6, the Gamma voltage groups and the display element 18 in FIG. 6 are respectively replaced with the corresponding voltages and the backlight module 28, and they are not detailed redundantly herein.

In summary, in the display device of the present disclosure, the ambient light brightness may be divided into a plurality of ambient light brightness ranges, and the Gamma voltage controller may provide different Gamma voltage groups to the light emitting units in different ambient light brightness ranges, such that the light emitting units may be operated in different operating modes; or the voltage controller may provide different voltages to the light emitting elements of the backlight module, such that the light emitting elements may be operated in different operating modes. Hence, the brightness of the light emitting units or the light emitting elements may not be limited to the range of emission duty ratio and may have different ranges respectively in different ambient light brightness ranges to improve the display brightness range of the display device, such that the usage requirement of the user in different ambient light is satisfied.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:

a plurality of light emitting units used to provide a plurality of operating modes, wherein the plurality of operating modes comprise a first operating mode and a second operating mode;

an ambient light sensor used to detect an ambient light brightness, wherein when the ambient light brightness is in a first ambient light brightness range, the plurality of light emitting units are operated in the first operating mode, wherein when the ambient light brightness is in a second ambient light brightness range, the plurality of light emitting units are operated in the second operating mode, and the ambient light brightness in the first ambient light brightness range is higher than the ambient light brightness in the second ambient light brightness range; and a Gamma voltage controller electrically connected to the plurality of light emitting units, wherein the Gamma voltage controller comprises a plurality of Gamma voltage groups, and the plurality of Gamma voltage groups comprise a first Gamma voltage group and a second Gamma voltage group;

a processor electrically connected to the ambient light sensor, wherein the processor is used to determine a target brightness of the display device; and an emission controller electrically connected to the processor, wherein the emission controller is used to provide an emission duty ratio, wherein the first Gamma voltage group and the second Gamma voltage group are respectively provided to the plurality of light emitting units in the first operating mode and in the second operating mode, the first Gamma voltage group comprises a first voltage and a second voltage respectively corresponding to a lowest gray level and a highest gray level in the first operating mode, the second Gamma voltage group comprises a third voltage and a fourth voltage respectively corresponding to a lowest gray level and a highest gray level in the second operating mode, and an absolute value of a difference between the first voltage and the second voltage is greater than an absolute value of a difference between the third voltage and the fourth voltage, wherein the plurality of light emitting units are electrically connected to the Gamma voltage controller and the emission controller, and the plurality of light emitting units are used to receive one of the plurality of Gamma voltage groups and the emission duty ratio, wherein the display device has a maximum brightness and a minimum brightness, and the minimum brightness is greater than 0, wherein when the target brightness of the display device is the maximum brightness, the plurality of light emitting units are operated in the first operating mode and receive the first Gamma voltage group provided by the Gamma voltage controller, and the emission duty ratio provided by the emission controller is a first emission duty ratio, wherein when the target brightness of the display device is the minimum brightness, the plurality of light emitting units are operated in the second operating mode and receive the second Gamma voltage group provided by the Gamma voltage controller, and the emission duty ratio provided by the emission controller is a second emission duty ratio, wherein the first emission duty ratio is greater than the second emission duty ratio, and the second emission duty ratio is greater than 0, and wherein a range of the target brightness of the display device in the first operating mode and a range of the target brightness of the display device in the second operating mode do not overlap.

2. The display device according to claim 1, wherein a ratio of the minimum brightness to the maximum brightness is less than a ratio of the second emission duty ratio to the first emission duty ratio.

3. The display device according to claim 1, wherein the display device has a threshold brightness, the minimum brightness is less than the threshold brightness, the threshold brightness is less than the maximum brightness, when the target brightness of the display device is greater than the threshold brightness and less than the maximum brightness, the plurality of light emitting units are operated in the first operating mode and receive the first Gamma voltage group provided by the Gamma voltage controller, the emission duty ratio provided by the emission controller is a third emission duty ratio, and the third emission duty ratio is less than the first emission duty ratio.

4. The display device according to claim 3, wherein when the target brightness of the display device is greater than the minimum brightness and less than or equal to the threshold brightness, the plurality of light emitting units are operated in the second operating mode and receive the second Gamma voltage group provided by the Gamma voltage controller, the emission duty ratio provided by the emission controller is a fourth emission duty ratio, and the fourth emission duty ratio is greater than the second emission duty ratio.

5. The display device according to claim 4, wherein the first emission duty ratio is greater than or equal to the fourth emission duty ratio.

6. The display device according to claim 4, wherein a ratio of a difference between the first emission duty ratio and the third emission duty ratio to a difference between the maximum brightness and the threshold brightness is less than a ratio of a difference between the fourth emission duty ratio and the second emission duty ratio to a difference between the threshold brightness and the minimum brightness.

7. The display device according to claim 3, wherein when the ambient light brightness is a minimum ambient light brightness in the first ambient light brightness range, the target brightness of the display device is a brightness, wherein when the ambient light brightness is a maximum ambient light brightness in the second ambient light brightness range, the target brightness of the display device is the threshold brightness, and the threshold brightness is less than the brightness.

8. The display device according to claim 1, wherein when the ambient light brightness is a minimum ambient light brightness in the first ambient light brightness range, the emission duty ratio provided by the emission controller is a fifth emission duty ratio, and the fifth emission duty ratio is greater than or equal to the second emission duty ratio.

9. The display device according to claim 8, wherein when the ambient light brightness is a maximum ambient light brightness in the second ambient light brightness range, the emission duty ratio provided by the emission controller is a sixth emission duty ratio, and the sixth emission duty ratio is greater than the fifth emission duty ratio.

10. The display device according to claim 1, wherein the target brightness of the display device is in a proportional relation with the ambient light brightness.

11. The display device according to claim 1, wherein a difference between a maximum ambient light brightness and a minimum ambient light brightness in the first ambient light brightness range is greater than a difference between a maximum ambient light brightness and a minimum ambient light brightness in the second ambient light brightness range.

12. The display device according to claim 1, wherein the first voltage is identical to the third voltage.

13. The display device according to claim 1, wherein when the plurality of light emitting units are operated in the first operating mode, the plurality of light emitting units generate a light pulse, and the light pulse has a first light intensity peak value, wherein when the plurality of light emitting units are operated in the second operating mode, the plurality of light emitting units generate another light pulse, the another light pulse has a second light intensity peak value different from the first light intensity peak value.

14. The display device according to claim 1, wherein the plurality of light emitting units comprise P-type thin film transistors, the second voltage is less than the first voltage, and the fourth voltage is less than the third voltage.

15. The display device according to claim 1, wherein the plurality of light emitting units comprise N-type thin film transistors, the second voltage is greater than the first voltage, and the fourth voltage is greater than the third voltage.

16. The display device according to claim 1, wherein the light emitting units have a first quantity of gray levels in the first operating mode, the light emitting units have a second quantity of gray levels in the second operating mode, and the first quantity is greater than the second quantity.

17. The display device according to claim 1, further comprising a data driver electrically connected to the plurality of light emitting units, and the data driver comprises the Gamma voltage controller.

* * * * *